No. 877,731. PATENTED JAN. 28, 1908.
F. T. PORTER.
INCUBATOR.
APPLICATION FILED SEPT. 19, 1906.
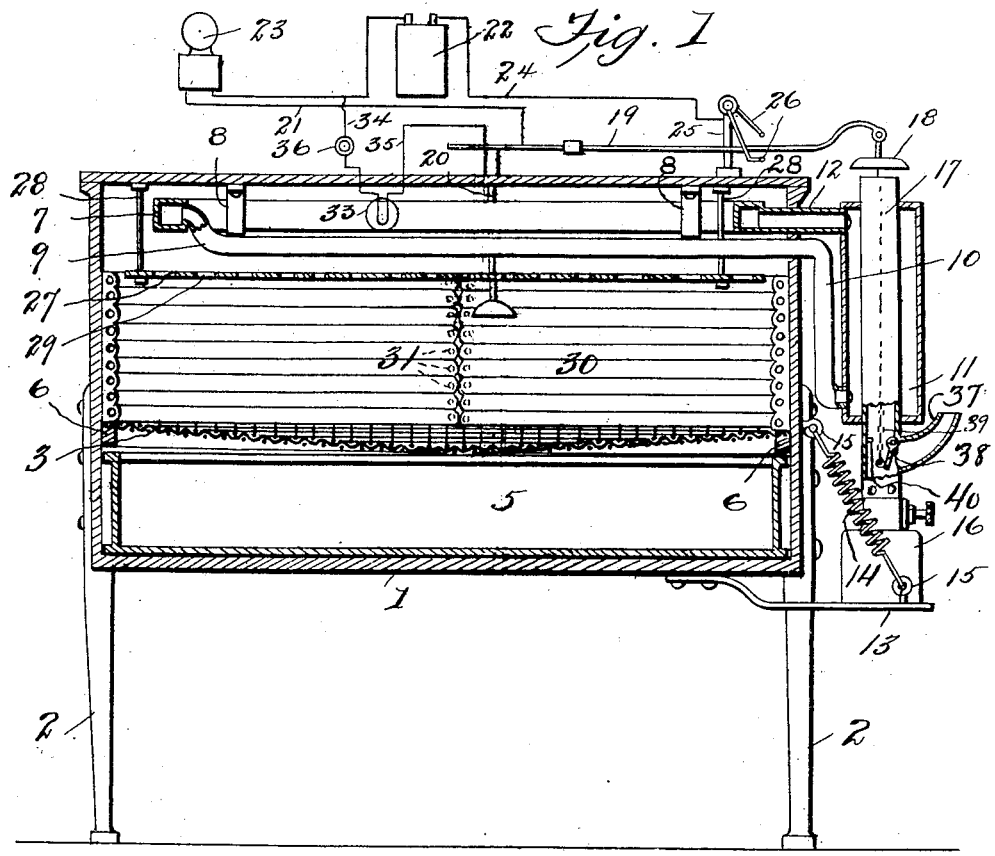
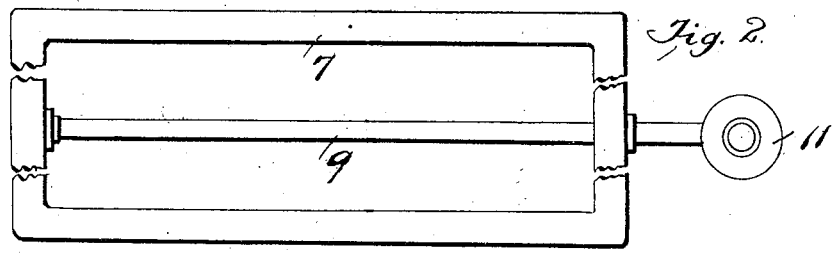
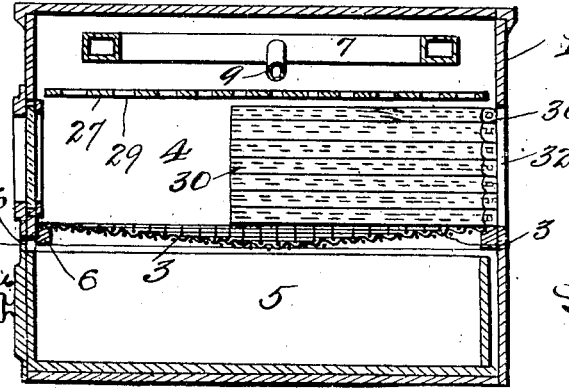
Witnesses
Chas. K. Davis
John D. Powers
Inventor
Fay T. Porter
By
Shepherd & Parker
Attorneys

UNITED STATES PATENT OFFICE.

FAY T. PORTER, OF MORRISTOWN, INDIANA.

INCUBATOR.

No. 877,731.   Specification of Letters Patent.   Patented Jan. 28, 1908.

Application filed September 19, 1906. Serial No. 335,318.

*To all whom it may concern:*

Be it known that I, FAY T. PORTER, a citizen of United States, residing at Morristown, in the county of Shelby and State of Indiana, have invented certain new and useful Improvements in Incubators, of which the following is a specification.

This invention relates to new and useful improvements in incubators.

The invention aims primarily to provide an incubator in which the temperature is evenly distributed and is constant throughout the period of use.

The invention further aims to provide means for affording a circulation of heated air admitted from the exterior.

The prime objection to air heating is due to the fact that the fresh air admitted for heating purposes is most frequently unevenly distributed and in its admission into the incubator varies considerable in temperature during the period of use. It will therefore be seen from the recital of the foregoing objects of the invention that it is contemplated to admit fresh air for heating purposes in such manner that temperature variations and direct contact with the eggs will be prevented.

The above and further objects will appear as the description of the detailed construction proceeds, reference being had to the accompanying drawings forming a part of this specification, like numerals designating like parts throughout the several views, wherein, Figure 1 is a longitudinal section of an incubator constructed in accordance with my invention. Fig. 2 is a plan view of the water tank in which the heating agent circulates, and Fig. 3 is a central transverse section thereof.

In the practical embodiment of my invention I employ a box or receptacle 1 supported on legs or corners posts 2. A tray 3 of reticulated material divides the receptacle 1 into an egg chamber 4 and a lower portion for the reception of a nursery draw 5. The tray 3 is supported in any desirable manner as upon a ledge 6 and drops to a central point so as to possess a substantial dish shape. Disposed in the upper part of the box 1 is a circulating tank 7 which comprises in its preferred embodiment a square tube of rectangular out lines supported from the top of the box 1 by suitable hangers 8. A drain pipe 9 leads at an incline from the forward portion of the tank 7, the other end of said pipe 9 being bent at an angle as at 10 and communicating with the lower portion of a reservoir 11 from the upper portion of which a supply 12 leads to the tank 7. A resilient shelf 13 is secured to the bottom of the box 1 and is braced by a suitably disposed retractile coil spring 14 having its ends secured in eye screws 15. Mounted upon the shelf 13 is a lamp 16 provided with a flue 17 which projects through the reservoir 11.

The heat from the flue 17 is directed against a guard 18 carried by a thermostat lever arm 19 mounted upon a suitable support 20. The arm 19 has connection with an electric wire 21 leading from a battery 22. An alarm bell 23 is interposed within the wire 21. A wire 24 also leads from the battery 22 and has connection with a post 25 from which depends in superposed relation contacts 26 with which the arm 19 engages in making a circuit. It will of course be understood that the arm 19 moves toward the respective contact 26 in accordance with its respective movements under expansion and contraction due to temperature variations.

Means are provided for controlling the passage of heated air through the flue 17 in accordance with the action of the arm 19. As shown in Fig. 1 a branch flue 37 leads from the flue 17 to the atmosphere at a point below the tank 11. Adjacent to said branch flue a pivoted damper or flap valve 38 is provided which at its free end has connection in any suitable manner with a chain 39 provided upon the end of the arm 19. When the heat becomes excessive and the arm 19, rises the valve 38 is raised until it engages the stop 40. In this position said valve closes communication through the flue 17 and permits of the heated air egressing through the branch flue 37. When the arm 19 descends under the contractive influence of a lower temperature the valve 38 gravitates to a position parallel to the axis of the flue 17 and permits of the passage of heated air through said flue, but closes communication with the branch flue 37.

The tray 3 being of reticulated material serves to permit of an uninterrupted circulation of heated air within the incubator and in this connection co-acts with a distributing plate 27 carried by rods 28 depending from the top of the box 1. The plate 27 is preferably provided with apertures 29 successively diminishing in diameter as they approach a central point, from the sides. Fresh air is supplied to the egg chamber 4 by means of suitably constructed air conductors 30 extending along three sides of the chamber 4. The conductors 30 are constituted of a plurality of independent pipes of suitable material provided in the back portions thereof with apertures 31 which communicate with a fresh air opening 32 formed in the rear wall of the box 1. As shown the pipes 30 are cast or molded in an integral section and terminate short of the front wall of the box 1 so as to discharge fresh heated air currents in parallelism to the sides of the chamber 4. This arrangement prevents an abrupt contact of the heated air with the eggs, but assures of its gradual dissipation throughout the entire chamber. It will, of course be understood that any suitable opening 45, constituting an outlet for the air within the incubator may be provided in the walls thereof to co-act with the conductors 30 in affording a free draft.

For the purposes of inspecting the interior of the box 1 an incandescent lamp 33 is provided which is in circuit with the battery 32 by wires 34 and 35 leading from the respective wires 21 and 24. As shown a push button or other suitable switch 36 is interposed in the wire 34 for controlling the lamp 33. The arrangement of the apertures 29 in the plate 27, that is all gradually decreasing diameter towards a central point serves to effect an even distribution of air by permitting greater currents of circulation through the plate adjacent its edges and thereby equalizes the circulation throughout the interior of the box 1. Owing to the fact that the egg tray 3 is of dish shape it will be readily apparent that the eggs may be more easily turned.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described my invention I claim:

1. In an incubator, a receptacle, an apertured plate supported transversely thereof and dividing said receptacle into a heating chamber and an egg chamber, and a heating agent located in said heating chamber, said plate having its apertures severally and gradually decreasing in diameter as they approach a determinate one of said apertures as and for the purpose set forth.

2. In an incubator, a receptacle, an apertured plate supported transversely thereof and dividing said receptacle into a heating chamber and an egg chamber, and a heating agent in said heating chamber, said plate having its apertures severally and gradually decreasing in diameter in successive order to a point central thereof.

3. In an incubator, a receptacle having a heating chamber and an egg chamber, means for effecting an even distribution of heat to said egg chamber, said receptacle having an opening in its walls, and means for effecting a circulation of air within said receptacle comprising conductors arranged in parallelism to one another and closely associated with the side walls of said receptacle in parallel relation thereto as a series, said conductors severally communicating at one end exteriorly of said receptacle and at their other end interiorly thereof and being adapted to discharge the currents of air circulated therethrough in initial parallelism to the adjacent side walls of said receptacle.

In testimony whereof I affix my signature in presence of two witnesses.

FAY T. PORTER.

Witnesses:
AI CLARK,
WILSON T. HANDY.